(12) United States Patent
Reynolds

(10) Patent No.: US 7,723,416 B2
(45) Date of Patent: May 25, 2010

(54) PEROXIDE DISPERSIONS

(75) Inventor: Jeffrey Reynolds, Cincinnati, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 12/329,867

(22) Filed: Dec. 8, 2008

(65) Prior Publication Data

US 2009/0124736 A1 May 14, 2009

Related U.S. Application Data

(63) Continuation-in-part of application No. 11/779,340, filed on Jul. 18, 2007, now Pat. No. 7,683,116, which is a continuation-in-part of application No. 11/178,652, filed on Jul. 11, 2005, now Pat. No. 7,550,532.

(51) Int. Cl.
*C08K 3/36* (2006.01)

(52) U.S. Cl. .................... 524/280; 524/451; 524/599

(58) Field of Classification Search ............. 524/280, 524/451, 599
See application file for complete search history.

(56) References Cited

U.S. PATENT DOCUMENTS

| | | | | |
|---|---|---|---|---|
| 2,967,756 A | * | 1/1961 | Mazzucchelli et al. | ... 428/539.5 |
| 3,051,679 A | | 8/1962 | Forsyth | |
| 3,737,027 A | * | 6/1973 | Ball | ............ 206/219 |
| 3,919,348 A | * | 11/1975 | Foster et al. | ............ 336/219 |
| 4,038,339 A | * | 7/1977 | Foster | ............ 525/25 |
| 4,071,489 A | | 1/1978 | Emmons et al. | |
| 4,263,198 A | | 4/1981 | Feldman et al. | |
| 4,310,644 A | | 1/1982 | Miley | |
| 4,600,738 A | | 7/1986 | Lamm et al. | |
| 4,867,989 A | | 9/1989 | Silva et al. | |
| 5,880,181 A | | 3/1999 | Torenbeek et al. | |
| 5,907,018 A | | 5/1999 | Mazurek et al. | |
| 6,821,569 B2 | | 11/2004 | Okada et al. | |
| 7,378,455 B2 | * | 5/2008 | Lu et al. | ............ 522/100 |
| 7,550,532 B2 | | 6/2009 | Reynolds | |
| 2003/0027903 A1 | * | 2/2003 | Nwoko et al. | ............ 524/104 |
| 2003/0035917 A1 | | 2/2003 | Hyman | |
| 2004/0092630 A1 | * | 5/2004 | Nwoko et al. | ............ 524/106 |
| 2007/0010609 A1 | | 1/2007 | Reynolds | |
| 2007/0265385 A1 | | 11/2007 | Reynolds | |

FOREIGN PATENT DOCUMENTS

| | | |
|---|---|---|
| GB | 729780 | 5/1955 |
| WO | 02088249 A2 | 11/2002 |
| WO | WO 2007/005280 * | 1/2007 |

OTHER PUBLICATIONS

Election/Restrictions Requirement for U.S. Appl. No. 11/417,231 dated Jun. 23, 2009.
Office Action for U.S. Appl. No. 11/417,231 dated Sep. 1, 2009.
Examination Report pertaining to Australian patent application No. 2006269216 dated Sep. 8, 2009.
Official Action pertaining to Canadian Application No. 2,614,745 dated Aug. 5, 2009.
International Search Report pertaining to International application No. PCT/US2006/026650 dated Jan. 19, 2007.
International Preliminary Report on Patentability pretaining to International application No. PCT/US2006/026650 dated Jan. 16, 2008.
International Search Report pertaining to International application No. PCT/US2007/008179 dated Sep. 24, 2007.
International Preliminary Report on Patentability pretaining to International application No. PCT/US2007/008179 dated Nov. 4, 2008.

* cited by examiner

*Primary Examiner*—Bernard Lipman
(74) *Attorney, Agent, or Firm*—Dinsmore & Shohl LLP

(57) ABSTRACT

A hardener composition useful in a two part resin system. The hardener composition includes a reactive carrier, a peroxide catalyst, a thickener and thixotropic agent selected from fumed silica and precipitated silica, and optionally a filler. The hardener composition can have a shelf life of over six months. A two-part polyester resin system and a method of making a polyester resin composition are also disclosed.

20 Claims, No Drawings

PEROXIDE DISPERSIONS

This application is a continuation-in-part of U.S. application Ser. No. 11/779,340, filed Jul. 18, 2007, now U.S. Pat. No. 7,683,116 entitled Peroxide Dispersions, which is a continuation-in-part of U.S. application Ser. No. 11/178,652, filed Jul. 11, 2005, now U.S. Pat. No. 7,550,532, entitled PolyesterResin Composition, each of which is incorporated herein by reference.

FIELD OF THE INVENTION

The present invention relates to peroxide dispersions and their use in curing thermoset resins for application in primers, body fillers, adhesives, and putties that are used in surface repairs and surface finishing for metal and plastic substrates for equipment and vehicles such as automotive, marine, agricultural and airborne vehicles, and industrial equipment.

BACKGROUND OF THE INVENTION

Traditionally, the polyester repair markets have utilized well-defined processes in the area of damage repair. Unsaturated polyester resins, primers, fillers, adhesives, or putties are used to resurface and reshape damaged areas. For ease of understanding, the term "resin" will be used in the following description; however, it is to be understood that the term includes cured resins and prepolymers (uncured resins), primers, fillers, adhesives, and putties. The method for catalyzation and application of the resin is as much an art as it is a science. This is due in part to the very small amount of peroxide hardener (catalyst) that is used to cure the much larger amounts of unsaturated polyester resin properly. The optimum peroxide level needed to cure the resin is generally about 1 to 3 parts per hundred of the resin by weight. The resin and peroxide are packaged in separate containers, typically a large can for the filler (8 oz. to 55 gal.), and a small tube for the peroxide catalyst (0.25 oz. to 4 oz.).

The user dispenses a variable amount of resin into a cup or onto a mixing board, and adds the peroxide catalyst, essentially guessing at the correct amount for proper catalyzation. The consequences of improper catalyzation of the resin include loss of adhesion to the substrate, uncured surface (tacky), cracking of the resin due to excessive heat generation, migration of uncured resin organics to subsequent coatings resulting in discoloration of top coats, outgassing of uncured material in the presence of ultraviolet or heat energy from sunlight or paint baking systems resulting in blistering and other damage to the topcoat, as well as other problems that may require removal and replacement of the repair.

Efforts have been made to provide controlled metering of the peroxide to ensure that the proper amount is mixed with the thermoset resin. Because many commercially available peroxide solutions have a viscosity similar to water, dispensing in a mechanical metering system was difficult in non-spray applications. As a result, there has been an attempt to develop a thicker, more controllable gel or paste form of the organic peroxide.

The standard benzoyl and ketone peroxides use plasticizers such as phthalates as carriers. U.S. Pat. No. 5,880,181 describes a gel comprising A) a solution of at least one organic peroxide essentially solubilized in a phlegmatizer, B) at least one cellulose ester as thickening agent essentially solubilized in solution A, and C) at least one thixotropic agent selected from hydrogenated castor oil and fumed silica. The phlegmatizer is selected from the group consisting of phthalates, glycols, citrates, benzoates, phosphates, adipic acid ester, glutaric acid ester, maleic acid ester, fumaric acid ester, succinic acid ester, butyrates, and mixtures thereof.

However, plasticizers and phlegmatizers are non-reactive. The non-reactive nature of the carrier does not adversely affect performance of the cure at levels of 1.5 to 3 parts per hundred unsaturated resin, but levels above 5 parts per hundred can disrupt the cure.

There remains a need in the art for a peroxide catalyst that can be easily metered and which will not disrupt curing of the resin.

SUMMARY OF THE INVENTION

The present invention meets this need by providing a hardener composition useful in a two-part resin system. The hardener composition includes a reactive carrier selected from diglycidal ether bisphenol A based epoxies, bisphenol A alkoxylates, or combinations thereof, a peroxide catalyst, a thickener and thixotropic agent selected from fumed silica, precipitated silica, or combinations thereof, and optionally, at least one filler.

Another aspect of the invention is a two-part polyester resin system. The two-part polyester resin composition includes: a hardener composition including a reactive carrier selected from diglycidal ether bisphenol A based epoxies, bisphenol A alkoxylates, or combinations thereof, a peroxide catalyst, a thickener and thixotropic agent selected from fumed silica, precipitated silica, or combinations thereof, and optionally, at least one filler; and a resin composition including a reactive polymer, a reactive monomer, or combinations thereof.

Another aspect of the invention is a method of making a polyester resin composition. The method includes: providing a hardener composition including: a reactive carrier selected from diglycidal ether bisphenol A based epoxies, bisphenol A alkoxylates, or combinations thereof, a peroxide catalyst, a thickener and thixotropic agent selected from fumed silica, precipitated silica, or combinations thereof, and optionally, at least one filler; providing a resin composition including: a reactive polymer, a reactive monomer, or combinations thereof, wherein a ratio of a volume of the hardener composition to a volume of the resin composition is about 1:10 to about 1:2; and mixing the hardener composition and the resin composition in the volume ratio of about 1:10 to about 1:2 to form the polyester resin composition.

DETAILED DESCRIPTION OF THE INVENTION

The present invention involves a polyester primer, resin, filler, adhesive, or putty that can be applied to metal substrates, such as cold rolled steel, galvanized steel, and aluminum, as well as to plastic substrates, such as polyesters, polyurethanes, polyolefins, sheet molding compounds (SMC), and bulk molding compounds (BMC).

The goal was to identify a carrier for the catalyst which will not react with the catalyst, which can be stabilized in the presence of peroxides, and which will be a reactive component in the system by crosslinking with the unsaturated polyester effectively, maintaining an integral cure. At a minimum, the carrier should not impede the cure of the unsaturated polyester. The material should be of a reasonable viscosity so as to be practical for dispensing and mixing. In addition, it should be stable in the presence of peroxides for long periods, such as more than six months, or more than one year, or longer.

The present invention involves the use of a reactive carrier, rather than a non-reactive carrier, such as phthalate plasticizers or phlegmatizers. The use of a reactive carrier greatly increases the challenge of stabilization of the blend. It will be a reactive component in the system, but it can be stabilized in the presence of the catalyst alone. When combined with the resins that are sufficiently thinned with reactive diluent, the reactive carrier can provide an integral cure with a catalyst dispersion level up to about 100 parts per hundred resin or filler by weight.

The ability to measure the mix ratio of catalyst to resin accurately will reduce or eliminate the most common problems associated with unsaturated polyester repair product use, and will increase the value of the product to the user.

The invention involves the use of peroxide catalysts dispersed in a reactive carrier to be used as the hardener side for a two-part resin system. Suitable reactive carriers include, but are not limited to, diglycidal ether bisphenol A based epoxies, bisphenol A alkoxylates, or combinations thereof.

This invention may be used in combination with the invention described in U.S. application Ser. No. 11/178,652 (U.S. Publication No. 2007/0010608), which is incorporated herein by reference, where a non-diluted unsaturated polyester resin is specified as a suitable reactive carrier. As described there, the unsaturated polyester should have a sufficiently low molecular weight that the viscosity is practical in the absence of a reactive diluent. Generally, the viscosity is less than about 10,000 cps. Most unsaturated polyesters are solids at room temperature in a non-diluted state. However, unsaturated polyesters designed for pigment dispersion have very low molecular weight. Examples include, but are not limited to, non-diluted, low viscosity maleate-based or fumarate-based unsaturated polyesters. The epoxy resin and the non-diluted unsaturated polyester resin may be combined in any ratio to be used as the reactive carrier for the peroxide.

Suitable peroxide catalysts include, but are not limited to, ketone peroxides, cumyl hydroperoxides, dibenzoyl peroxides, peroxyesters, peroxyketals, and peroxydicarbonates. Suitable ketone peroxides include, but are not limited to, methyl ethyl ketone peroxide, 2,4-pentadione peroxide, methyl isobutyl ketone peroxide, acetyl acetone peroxide, cyclohexanone peroxide, or combinations thereof.

The same material, fumed silica, precipitated silica, or combinations thereof, is used as both the thickener and thixotropic agent, which reduces the number of components that must be used.

The hardener side can also include fillers such as talcs, carbonates, pigments, rheological modifiers, microspheres, pigment wetting and dispersing agents, paraffins, and fiber reinforcements, or combinations thereof.

The resin side of the system can include a reactive polymer, or a monomer, or a combination of the two. Suitable reactive polymers include, but are not limited to, unsaturated polyesters, vinyl esters, and hybrid epoxy-polyester and acrylate-polyester systems that polymerize by way of a free radical mechanism, or combinations thereof. Suitable monomers include, but are not limited to, styrene, vinyl toluene, other methyl styrene monomers, methyl methacrylate, and other acrylate monomers, or combinations thereof.

The resin side can also include fillers such as talcs, carbonates, pigments, rheological modifiers, microspheres, pigment wetting and dispersing agents, paraffins, and fiber reinforcements, or combinations thereof.

The fillers can be included in the hardener side and the resin side so that the volume of the two compositions are approximately the same. The ratio of the volume of the hardener side to the volume of the resin side is generally about 1:10 to about 1:2. With the volume ratio in this range, it is much easier to provide the correct amount of hardener for the amount of resin used, eliminating the guesswork of prior art systems.

Controlling the volume of each side will allow the use of a variety of mixing tube applicators. One example of a mixing tube applicator is a double barrel mixing tube which has the hardener composition on one side and the resin composition on the other side. The plunger dispenses the hardener composition and resin composition in the proper amounts so that they can be mixed and applied.

Another suitable mixing tube applicator is a "universal cartridge." The universal cartridge incorporates both sides of the product in a single barrel. It uses front and back chambers with a transfer tube from the back to deliver both sides in the correct ratio. The benefit of a universal cartridge is the ability to use it with any caulk gun, instead of specific side by side guns. Suitable universal cartridge delivery systems are described in U.S. Pat. Nos. 5,310,091 and 6,938,797.

In order that the invention may be more readily understood, reference is made to the following examples which are intended to illustrate the invention, but not limit the scope thereof.

EXAMPLE 1

The viscosity of a hardener composition was measured at high temperature (i.e., 110° F., and 105° F.) over 43 days. The formulation for the hardener component is shown below. The viscosity (in centipoise (cps)) of the dispersion appears in Table 1.

| Hardener | |
|---|---|
| Raw Material | % by weight |
| Epoxy Resin 324 | 48.76 |
| 50% Benzoyl Peroxide Paste | 40.67 |
| Fumed Silica (Aerosil 200) | 4.07 |
| Glass Microspheres (3M s-22) | 6.5 |
| | 100 |

The hardener was mixed with several resin compositions as shown below. Sample 1 was a putty, while Samples 2 and 3 were fillers. Table 2 shows the gel time (in min.) for the mixed samples.

| | Resin Composition | | |
|---|---|---|---|
| Raw Material | 1 % by weight | 2 | 3 |
| Resin | 50.13 | 40.76 | 55.38 |
| Reactive Diluent | 7.06 | 3.80 | |
| Rheological Modifier | 0.51 | | 1.17 |
| Adhesion Promoter | | 1.20 | 1.32 |
| Pigment | 5.05 | 1.11 | 2.33 |
| Talc | 28.41 | 46.47 | 32.50 |
| Microspheres | 8.84 | 6.66 | 7.30 |
| Total | 100.00 | 100.00 | 100.00 |

The viscosity and gel time tests are accelerated aging tests. Thirty (30) days at a temperature of 105° F. (the maximum temperature recommended by peroxide manufacturers) simulates one year shelf life at ambient temperature. The 110° F. testing represented a harsher environment to check any limitations the material product may have. The sample passes if the 30 day viscosity test is up to 3 times the original viscosity. For gel time, the sample passes if the 30 day gel time is up to twice original gel time. The cartridges were placed in an oven at the specified temperature for aging. They were removed, tested, and put back into the oven until the next test. This testing was continued until the cartridge material was gone.

The samples passed both the viscosity and gel time tests.

TABLE 1

| | Sample | | | | | | | | | | | | | | |
|---|---|---|---|---|---|---|---|---|---|---|---|---|---|---|---|
| | 1/1 | 1/2 | 1/3 | 1/4 | 1/5 | 1/6 | 1/7 | 2/1 | 2/2 | 2/3 | 2/4 | 2/5 | 3/1 | 3/2 | 3/3 |
| Temp | 110 F. | 110 F. | 105 F. | 105 F. | 105 F. | 105 F. | 105 F. | 105 F. | 105 F. | 105 F. | 105 F. | 105 F. | 105 F. | 105 F. | 105 F. |
| Day 1 | 12791 | 11650 | 12819 | 21352 | 10664 | 11110 | 10575 | 14105 | 21543 | 14650 | 15465 | 14326 | 14611 | 15059 | 15188 |
| Day 2 | | | | | | | | | | | | | | | |
| Day 3 | 11379 | 10933 | 8535 | | | | | 9303 | | | | | | | |
| Day 4 | | | | | | | | | | | | | | 13190 | |
| Day 5 | | | | 11404 | | | | | 9344 | | | | | | |
| Day 6 | | | | | | | | | | | | | | | |
| Day 7 | 17609 | 25511 | | | | | | | | | | | | | |
| Day 8 | | | | | 15900 | | | | | 14480 | | | | | |
| Day 9 | | | | | | | | | | | | | | | |
| Day 10 | | | | | | 16123 | | | | | 18406 | | | | |
| Day 11 | | | | | | | | | | | | | | | |
| Day 12 | | | | | | | | | | | | | | | |
| Day 13 | | | | | | | | | | | | | | 23324 | |
| Day 14 | | | | | | | | | | | | | | | |
| Day 15 | | | 20300 | | | | | 21359 | | | | | | | 25825 |
| Day 16 | | | | | | | | | | | | | | | |
| Day 17 | | | | | | | | | | | | | | | |
| Day 18 | 41413 | 27100 | | | | | | | | | | | | 26103 | |
| Day 19 | | | | | | | | | | | | | | | |
| Day 20 | | | | | | | | | | | | | | | |
| Day 21 | | | | | | | | | | | | | | | |
| Day 22 | | | | 25521 | | | | | 22166 | | | | 26611 | | |
| Day 23 | | | | | | | | | | | | | | | |
| Day 24 | | | | | 29277 | | | | | 24432 | | | | | |
| Day 25 | | | | | | | | | | | | | | | |
| Day 26 | | | | | | 26730 | | | | | 26675 | | | | |
| Day 27 | | | | | | | | | | | | | | 33578 | |
| Day 28 | | | | | | | | | | | | | | | |
| Day 29 | | | | | | | | | | | | | | | |
| Day 30 | | | | | | | | 28772 | | | | | | | |
| Day 31 | | | | | | | 26617 | | | | | 27429 | | | |
| Day 32 | | | | | | | | | | | | | | | 36064 |
| Day 33 | | | | 40891 | | | | | 23827 | | | | | | |
| Day 34 | | | | | | | | | | | | | | | |
| Day 35 | | | | | | | | 35593 | | | | | | | |

TABLE 1-continued

| | \multicolumn{15}{c}{Sample} | | | | | | | | | | | | | |
|---|---|---|---|---|---|---|---|---|---|---|---|---|---|---|---|
| | 1/1 | 1/2 | 1/3 | 1/4 | 1/5 | 1/6 | 1/7 | 2/1 | 2/2 | 2/3 | 2/4 | 2/5 | 3/1 | 3/2 | 3/3 |
| | \multicolumn{15}{c}{Temp} | | | | | | | | | | | | | |
| | 110 F. | 110 F. | 105 F. | 105 F. | 105 F. | 105 F. | 105 F. | 105 F. | 105 F. | 105 F. | 105 F. | 105 F. | 105 F. | 105 F. | 105 F. |
| Day 36 | | | | | | | | | | | | | | 36395 | |
| Day 37 | | | | | | | | | | | | | | | |
| Day 38 | | | | | | | | | | | | | | | |
| Day 39 | | | | | | | | | | | | | | | |
| Day 40 | | | | | | | | | | | | | | | |
| Day 41 | | | | | | | 92653 | | | | | | | | |
| Day 42 | | | | | | | | | | | | | | | |
| Day 43 | | | | | | | | | | | | 29093 | | | |

TABLE 2

| | \multicolumn{15}{c}{Sample} | | | | | | | | | | | | | |
|---|---|---|---|---|---|---|---|---|---|---|---|---|---|---|---|
| | 1/1 | 1/2 | 1/3 | 1/4 | 1/5 | 1/6 | 1/7 | 2/1 | 2/2 | 2/3 | 2/4 | 2/5 | 3/1 | 3/2 | 3.3 |
| | \multicolumn{15}{c}{Temp} | | | | | | | | | | | | | |
| | 110 F. | 110 F. | 105 F. | 105 F. | 105 F. | 105 F. | 105 F. | 105 F. | 105 F. | 105 F. | 105 F. | 105 F. | 105 F. | 105 F. | 105 F. |
| Day 1 | 2.75 | 2.88 | 2.73 | 2.82 | 2.78 | 2.67 | 2.78 | 2.95 | 2.25 | 2.87 | 2.95 | 2.67 | 3.5 | 3.17 | 3.35 |
| Day 2 | | | | | | | | | | | | | | | |
| Day 3 | 3.28 | 3.55 | 2.48 | | | | | 2.42 | | | | | | | |
| Day 4 | | | | | | | | | | | | | | 3.02 | |
| Day 5 | 3.05 | 2.98 | | 2.67 | | | | 2.48 | | | | | | | |
| Day 6 | | | | | | | | | | | | | | | |
| Day 7 | 3.25 | | | | | | | | | | | | | | |
| Day 8 | | | | | 2.6 | | | | | 2.53 | | | | | |
| Day 9 | | | | | | | | | | | | | | | |
| Day 10 | | 3.62 | | | | 3.13 | | | | | 3.47 | | | | |
| Day 11 | | | | | | | | | | | | | | | |
| Day 12 | 3.27 | | | | | | | | | | | | | | |
| Day 13 | | | | | | | | | | | | | | 2.78 | |
| Day 14 | | 3.12 | | | | | | | | | | | | | |
| Day 15 | | | 2.83 | | | | | | 2.45 | | | | | | 3.32 |
| Day 16 | | | | | | | | | | | | | | | |
| Day 17 | | | | | | | | | | | | | | | |
| Day 18 | 2.93 | | | | | | | | | | | | | 3.55 | |
| Day 19 | | | | | | | | | | | | | | | |
| Day 20 | | | | | | | | | | | | | | | |
| Day 21 | | | | | | | | | | | | | | | |
| Day 22 | | | | 3.68 | | | | | | 3.5 | | | 3.13 | | |

TABLE 2-continued

| | | | | | | | | Sample | | | | | | | |
|---|---|---|---|---|---|---|---|---|---|---|---|---|---|---|---|
| | 1/1 | 1/2 | 1/3 | 1/4 | 1/5 | 1/6 | 1/7 | 2/1 | 2/2 | 2/3 | 2/4 | 2/5 | 3/1 | 3/2 | 3.3 |
| | | | | | | | | Temp | | | | | | | |
| | 110 F. | 110 F. | 105 F. | 105 F. | 105 F. | 105 F. | 105 F. | 105 F. | 105 F. | 105 F. | 105 F. | 105 F. | 105 F. | 105 F. | 105 F. |
| Day 22 | | | | | | | | | | | | | | | |
| Day 23 | | | | | | | | | | | | | | | |
| Day 24 | | | | | 3.63 | | | | | 3.72 | | | | | |
| Day 25 | | | | | | | | | | | | | | | |
| Day 26 | | | | | 4.97 | | | | | | 3.92 | 4.27 | | | |
| Day 27 | | | | | | | | | | | | | | 4.5 | |
| Day 28 | | | | | | | | | | | | | | | |
| Day 29 | | | | | | | | | | | | | | | |
| Day 30 | | | | | | | | 2.45 | | | | | | | |
| Day 31 | | | | | 5.42 | | | | | | | 4.37 | | | |
| Day 32 | | | | | | | | | | | | | | | 4.83 |
| Day 33 | | | | | | | | | 3.88 | | | | | | |
| Day 34 | | | | | | | | | | | | | | | |
| Day 35 | | | | | 5.5 | | | | | | | | | | |
| Day 36 | | | | | | | | | | | | | 5.67 | | |
| Day 37 | | | | | | | | | | | | | | | |
| Day 38 | | | | | | | | | | | | | | | |
| Day 39 | | | | | | | | | | | | | | | |
| Day 40 | | | | | | | | | | | | | | | |
| Day 41 | | | | | 5.52 | | | | | | | | | | |
| Day 42 | | | | | | | | | | | | | | | |
| Day 43 | | | | | | | | | 5.13 | | | | | | |

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A hardener composition useful in a two part resin system consisting essentially of:
   a reactive carrier selected from diglycidal ether bisphenol A based epoxies, bisphenol A alkoxylates, or combinations thereof;
   a peroxide catalyst;
   a thickener and thixotropic agent selected from fumed silica, precipitated silica, or combinations thereof; and
   optionally, at least one filler.

2. The hardener composition of claim 1 wherein the hardener composition has a shelf life of over six months.

3. The hardener composition of claim 1, wherein the peroxide catalyst is selected from ketone peroxides, cumyl hydroperoxides, dibenzoyl peroxides, peroxyesters, peroxyketals, peroxydicarbonates, or combinations thereof.

4. The hardener composition of claim 3, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide, or combinations thereof.

5. The hardener composition of claim 1, wherein the filler is selected from talcs, carbonates, pigments, rheological modifiers, microspheres, pigment wetting and dispersing agents, paraffins, fiber reinforcements, or combinations thereof.

6. The hardener composition of claim 1 wherein the reactive carrier further comprises a non-diluted unsaturated polyester.

7. The hardener composition of claim 6 wherein the non-diluted unsaturated polyester comprises a short chain unsaturated aliphatic dicarboxylic acid based polyester.

8. The hardener composition of claim 7, wherein the short chain unsaturated aliphatic dicarboxylic acid based polyester comprises a maleate based polyester or a fumarate based polyester.

9. A two-part polyester resin system comprising:
a hardener composition consisting essentially of:
   a reactive carrier selected from diglycidal ether bisphenol A based epoxies, bisphenol A alkoxylates, or combinations thereof;
   a peroxide catalyst;
   a thickener and thixotropic agent selected from fumed silica, precipitated silica, or combinations thereof; and
   optionally, at least one filler; and
a resin composition comprising:
   a reactive polymer, a reactive monomer, or combinations thereof.

10. The two-part polyester resin system of claim 9 wherein the hardener composition has a shelf life of over six months.

11. The two-part polyester resin system of claim 9, wherein the peroxide catalyst is selected from ketone peroxides, cumyl hydroperoxides, dibenzoyl peroxides, peroxyesters, peroxyketals, peroxydicarbonates, or combinations thereof.

12. The two-part polyester resin system of claim 9, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide, or combinations thereof.

13. The two-part polyester resin system of claim 9, wherein the resin composition further comprises at least one filler.

14. The two-part polyester resin system of claim 13, wherein the filler is selected from talcs, carbonates, pigments, rheological modifiers, microspheres, pigment wetting and dispersing agents, paraffins, fiber reinforcements, or combinations thereof.

15. The two-part polyester resin system of claim 9, wherein the filler is selected from talcs, carbonates, pigments, rheological modifiers, microspheres, pigment wetting and dispersing agents, paraffins, fiber reinforcements, or combinations thereof.

16. The two-part polyester resin system of claim 9, wherein the resin composition comprises the reactive polymer selected from unsaturated polyesters, vinyl esters, hybrid epoxy-polyester systems, hybrid acrylate-polyester systems, or combinations thereof.

17. The two-part polyester resin system of claim 9, wherein the resin composition comprises the reactive monomer selected from styrene, vinyl toluene, methyl styrene monomers, methyl methacrylate, acrylate monomers, or combinations thereof.

18. The two-part polyester resin system of claim 9 wherein the reactive carrier further comprises a non-diluted unsaturated polyester.

19. The two-part polyester resin system of claim 9, wherein a ratio of a volume of the hardener composition to a volume of the resin composition is in a range of about 1:10 to about 1:2.

20. A method of making a polyester resin composition comprising:
providing a hardener composition consisting essentially of:
   a reactive carrier selected from diglycidal ether bisphenol A based epoxies, bisphenol A alkoxylates, or combinations thereof;
   a peroxide catalyst;
   a thickener and thixotropic agent selected from fumed silica, precipitated silica, or combinations thereof; and
   optionally, at least one filler;
providing a resin composition comprising:
   a reactive polymer, a reactive monomer, or combinations thereof;
wherein a ratio of a volume of the hardener composition to a volume of the resin composition is about 1:10 to about 1:2; and
mixing the hardener composition and the resin composition in the volume ratio of about 1:10 to about 1:2 to form the polyester resin composition.

\* \* \* \* \*